(12) United States Patent
Martineau et al.

(10) Patent No.: US 10,338,842 B2
(45) Date of Patent: Jul. 2, 2019

(54) NAMESPACE/STREAM MANAGEMENT

(71) Applicant: Samsung Electronics Co., Ltd., Suwon-si, Gyeonggi-do (KR)

(72) Inventors: Jason Martineau, Milpitas, CA (US); Stephen Garry Fischer, Mountain View, CA (US); Changho Choi, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 126 days.

(21) Appl. No.: 15/678,986

(22) Filed: Aug. 16, 2017

(65) Prior Publication Data

US 2018/0335947 A1    Nov. 22, 2018

Related U.S. Application Data

(60) Provisional application No. 62/508,829, filed on May 19, 2017.

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0611* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 6,496,311 B1 | 12/2002 | Sato | |
| 8,738,621 B2 | 5/2014 | Hinrichs | |
| 9,466,383 B2 | 10/2016 | Peng | |
| 2012/0072798 A1 | 3/2012 | Unesaki et al. | |
| 2016/0283125 A1 | 9/2016 | Hashimoto | |
| 2016/0313943 A1 | 10/2016 | Hashimoto | |
| 2017/0139838 A1* | 5/2017 | Tomlin | G06F 3/0611 |
| 2017/0075832 A1 | 11/2017 | Bhimani et al. | |
| 2018/0150257 A1* | 5/2018 | Griffith | G06F 3/0626 |
| 2018/0232160 A1* | 8/2018 | Das | G06F 3/0616 |
| 2018/0260154 A1* | 9/2018 | Dronamraju | G06F 3/0631 |

* cited by examiner

*Primary Examiner* — Kaushikkumar M Patel
(74) *Attorney, Agent, or Firm* — Innovation Counsel LLP

(57) ABSTRACT

A method includes: receiving logical streams from a plurality of namespaces; determining characteristics of logical streams associated with the plurality of namespaces; selecting a configurable assignment mode; and assigning the logical streams associated with the plurality of namespaces to a plurality of hardware streams to access physical storage blocks associated with a data storage device based on the characteristics of the logical streams and the configurable assignment mode. A number of hardware streams to access the physical storage blocks associated with the data storage drive is fixed, and a number of logical streams associated with the plurality of namespaces is varied depending on I/O processes running on a host computer.

19 Claims, 12 Drawing Sheets

| | NS 1 (1) | NS 2 (8) | NS 3 (64) | NS 4 (2) | NS 5 (4) | NS 6 (1) |
|---|---|---|---|---|---|---|
| LS Proportion (1) | 0.0125 | 0.1 | 0.8 | 0.025 | 0.05 | 0.0125 |
| Throughputs (MB/s) | 12 | 24 | 64 | 8 | 8 | 4 |
| TP Proportion (1) | 0.1 | 0.2 | 0.533 | 0.067 | 0.067 | 0.033 |
| Weighted LS | 8 | 16 | 42.667 | 5.333 | 5.333 | 2.667 |
| Weighted Proportional (16) | 2 | 3 | 9 | 1 | 1 | 0 |

Total Hardware Streams 16

FIG. 2B

| NS 1 | NS 2 | NS 3 | NS 4 | NS 5 | NS 6 | NS 7 | NS 8 |
|---|---|---|---|---|---|---|---|
| Individual (5) | | | | | | | |
| 1 | 1 | 1 | 1 | 1 | 0 | 0 | 0 |
| Trans-Namespace (3) | | | | | | | |
| | | | | | 3 (share with NS7 and NS8) | 3 (share with NS6 and NS8) | 3 (share with NS6 and NS7) |

Total Hardware Streams 8

FIG. 5A

NAMESPACE/STREAM MANAGEMENT

CROSS-REFERENCE TO RELATED APPLICATION(S)

This application claims the benefits of and priority to U.S. Provisional Patent Application Ser. No. 62/508,829 file May 19, 2017, the disclosure of which is incorporated herein by reference in its entirety.

TECHNICAL FIELD

The present disclosure relates generally to multi-streaming capable storage devices, more particularly, to a system and method for mapping streams to storage blocks based on namespaces.

BACKGROUND

Multi-streaming of a solid-state drive (SSD) enables related data to be stored on the same physical erase blocks under the belief that the similar stored data can have similar invalidation times, and can be garbage collected more efficiently. Thus, multi-streaming can reduce a write amplification factor (WAF) of the SSD.

Modern SSDs implemented with the multi-streaming feature typically have a limited number of hardware streams available, for example 8 to 16 hardware streams. However, modern SSDs are capable of housing many independent namespaces, and each namespace may have numerous logical streams. Conventional multi-streaming schemes that focuses on identifying and merging streams do not take into account the association of the logical streams to the affiliated namespaces.

SUMMARY

According to one embodiment, a method includes: receiving logical streams from a plurality of namespaces; determining characteristics of logical streams associated with the plurality of namespaces; selecting a configurable assignment mode; and assigning the logical streams associated with the plurality of namespaces to a plurality of hardware streams to access physical storage blocks associated with a data storage device based on the characteristics of the logical streams and the configurable assignment mode. A number of hardware streams to access the physical storage blocks associated with the data storage drive is fixed, and a number of logical streams associated with the plurality of namespaces is varied depending on I/O processes running on a host computer.

According to another embodiment, a data storage device includes: a plurality of data storage blocks; and a stream mapper configured to: receive logical streams from a plurality of namespaces; determine characteristics of logical streams associated with the plurality of namespaces; select a configurable assignment mode; and assign the logical streams associated with the plurality of namespaces to a plurality of hardware streams to access the plurality of data storage blocks based on the characteristics of the logical streams and the configurable assignment mode. A number of hardware streams to access the physical storage blocks associated with the data storage drive is fixed, and a number of logical streams associated with the plurality of namespaces is varied depending on I/O processes running on a host computer.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 2B shows an example weighted proportional scheme for assigning logical streams to hardware streams, according to one embodiment;

FIG. 5A shows an example of a hybrid auto-streaming scheme, according to one embodiment;

Figure 1:
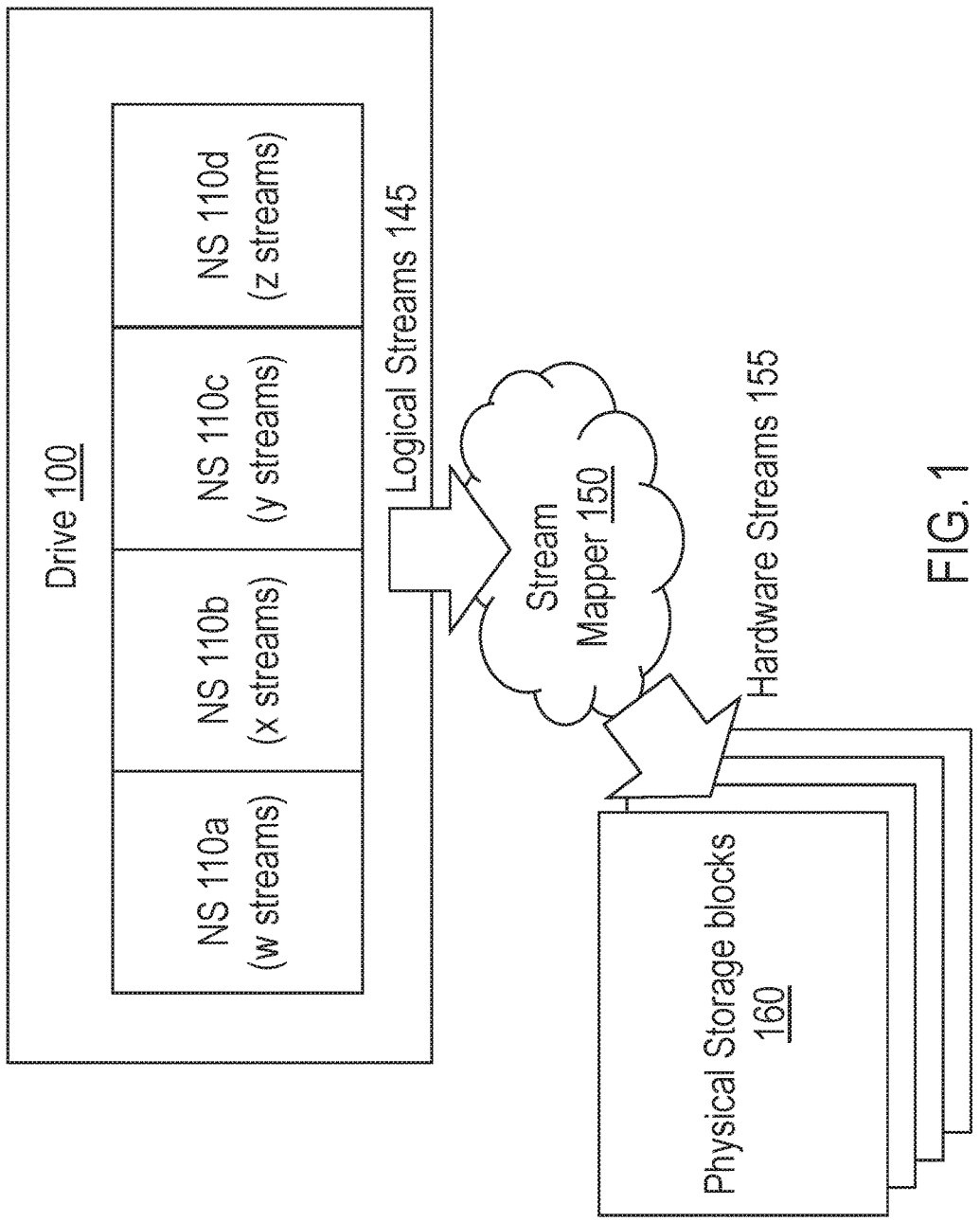
FIG. 1 shows a block diagram of an example stream-mapping system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for mapping streams to storage blocks based on namespaces. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a stream mapper of a data storage device for assigning hard-stream (that is SSD hardware-supported stream, herein also referred to as "hardware stream") resources to namespaces based on the affiliations of namespaces. Examples of the namespace affiliations include, but are not limited to, a number of namespaces, a number of logical streams per namespace, the input/output patterns of the logical streams, and the use of the logical streams. The stream mapper maps a large number of streams and namespaces as seen from a host into a limited number of hardware streams available from the data storage device. The mapping scheme employed by the present stream mapper can take one or more of the following approaches including: a fair and balanced approach, a proportional approach, a proportional and fair approach, and a hybrid auto-stream approach.

FIG. 1 shows a block diagram of an example stream-mapping system, according to one embodiment. A data storage drive 100 (e.g., an SSD) is a multi-stream enabled drive including four namespaces NS 110a, 110b, 110c, and 110d, and each of the four namespaces has one or more logical streams 145, for example, w, x, y, and z. The stream-mapping system has a fixed number of hardware streams 155 to access physical storage blocks 160 associated with the data storage drive 100. The number of logical streams 145 and the number of hardware streams 155 may be different from each other. A stream mapper 150 maps the logical streams 145 of the namespaces to the hardware streams 155.

According to one embodiment, the stream mapper 150 can map the logical streams 145 based on various mapping schemes. The mapping schemes implemented by the stream mapper 150 may dynamically change during a runtime depending on various operating conditions such as the workload, the number of namespaces and the number of logical and hardware streams. For example, the stream mapper 150 can employ one of a proportional scheme, a fair and balanced scheme, an even and proportional scheme, and a hybrid auto-streaming scheme.

According to one embodiment, I/O traffic (e.g., I/O packets) from namespaces that have not been otherwise assigned to any stream may be assigned to a general I/O handler. In some ways, the general I/O handler aggregates I/O traffic similar to a stream, but the I/O data going into the general I/O handler may not have unifying, common characteristic other than that it does not share characteristics with the other streams. This general purpose I/O handler may require a stream (or not), depending on the implementation. In cases where it requires a stream, the stream that is assigned to the general I/O handler is subtracted from the total hardware stream availability before specific stream assignment schemes are applied.

According to one embodiment, the stream mapper 150 can select namespaces to share hardware streams using auto-streaming and/or stream consolidation techniques. Examples of stream assignment approaches that the stream mapper 150 can employ include, but are not limited to, a data write sequentially based approach, a data write frequency and recency (SFR) approach, a multi-queue approach, a round robin approach. The logical streams of the namespaces may be grouped together based on their similarities of the data, for example, a write sequentiality, a lifespan, a timing pattern, an I/O size, a file type (e.g., MS Excel, Word), etc. Various auto-streaming and/or stream consolidation techniques are described in U.S. patent application Ser. No. 15/499,877 filed Jul. 13, 2015 and entitled "Automatic Stream Detection & Assignment Algorithm," Ser. No. 15/458,968 filed Oct. 26, 2016 and entitled "Method of Consolidating Data Streams for Multi-Stream Enabled SSDs," and Ser. No. 15/344,422 filed Nov. 4, 2016 and entitled "Smart I/O Stream Detection based on Multiple Attributes," the disclosures of which are incorporated by reference.

Multiple namespace control employed by the stream mapper 150 enables a plurality of logical address spaces (LBA spaces) to be allocated to the data storage drive 100 by handling the data storage drive 100 as if it were a plurality of virtual drives. A write command from a host includes an identifier of a specific namespace. The stream mapper 150 can determine the namespace to be accessed based on the identifier of the namespace included in the write command. The host can thereby handle the virtual drives of the data storage drive 100 without partitioning the logical address space into a plurality of spaces, as if the data storage drive 100 were a plurality of drives. The multi namespace control can therefore reduce the total cost of ownership (TCO) on the host side.

In one embodiment, the stream mapper 150 can treat all logical I/O streams from a namespace as if they were a single stream (regardless of the number of logical streams from the namespace) and then analyzes and merges the most similar namespaces at the hardware stream level.

According to one embodiment, the stream mapper can map logical streams based on a proportional scheme. According to the proportional scheme, the stream mapper 150 assigns to each namespace a number of hardware streams in proportion to its logical stream demands and/or read/write throughput. For example, the number of logical streams can be used to determine the proportion of the hardware streams to be assigned to each namespace. In another example, each of logical streams may be given a weight, and the weighted logical streams for each namespace may be used to determine the proportion of the hardware stream assignment. One or more namespaces may be merged if the number of namespaces is larger than the number of hardware streams available.

Figure 2A:
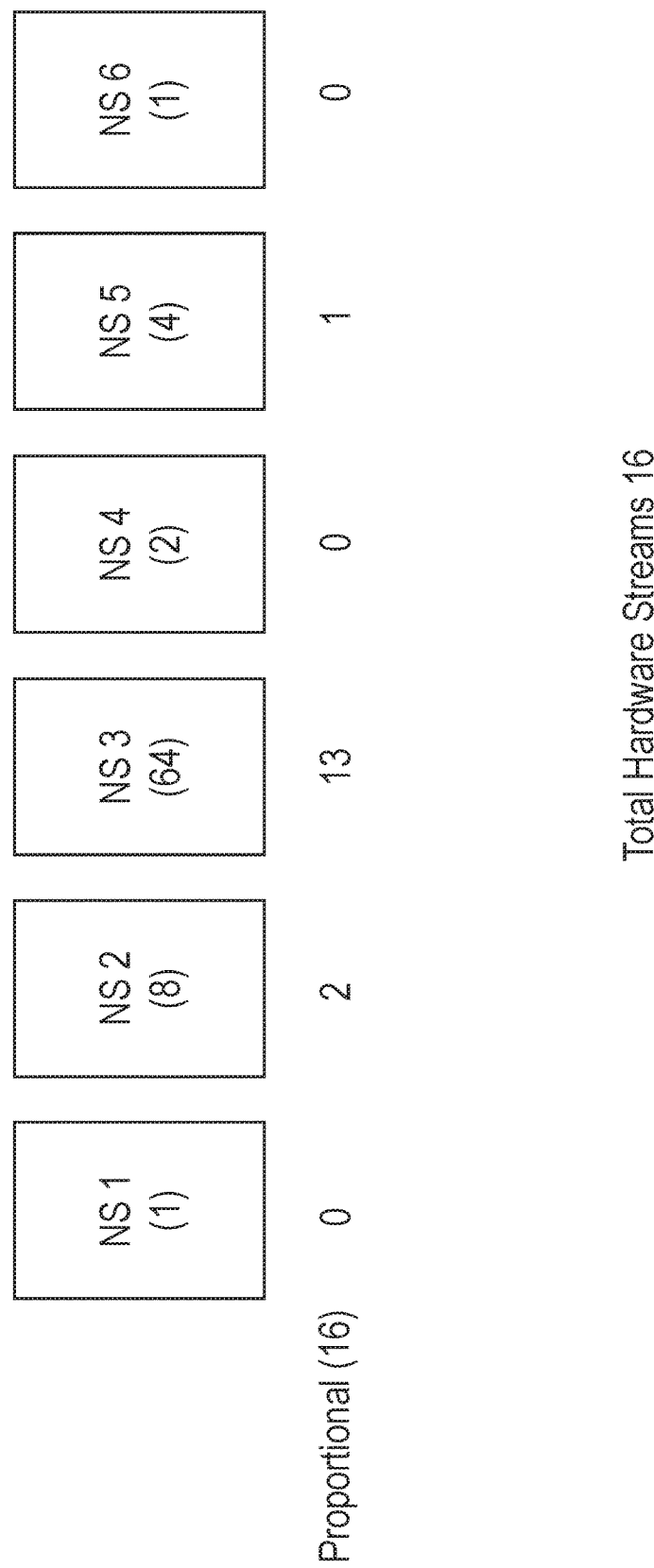
FIG. 2A shows an example proportional scheme for assigning logical streams to hardware streams, according to one embodiment.

FIG. 2A shows an example proportional scheme for assigning logical streams to hardware streams, according to one embodiment. In this example, the namespace NS1 has 1 logical stream, the namespace NS2 has 8 logical streams, the namespace NS3 has 64 logical streams, the namespace NS4 has 2 logical streams, the namespace NS5 has 4 logical streams, and the namespace 6 has 1 logical streams. The stream mapper 150 may treat the logical streams without giving a weight. The total number of logical streams is 80. Depending on the proportionality, the namespace NS2 is assigned with 2 hardware streams, the namespace NS3 is assigned with 13 hardware streams, and the namespace NS5 is assigned with 1 hardware stream. The namespaces NS1, NS4, and NS6 are not assigned with any hardware streams. After the logical streams of the NS2, NS3, and NS5 are completed or put on a hold, the hardware streams that are freed may be reassigned to the namespaces NS1, NS4, and NS6.

According to one embodiment, the namespace assignment based on the proportional scheme may be based on weighted logical streams. Each logical stream may be given a weight, and the weighted sum of the logical streams for each namespace is factored in assigning the number of hardware streams. Some logical streams may be given a higher weight than other logical streams. Further, some namespaces may be given a higher weight than other namespaces. For example, at least one logical stream of each namespace may be given a higher weight based on a throughput of the logical streams. The logical streams with a high throughput may get weighted higher than those with a lower throughput. Therefore, a namespace with a low number of high-throughput logical streams can get a share of the hardware streams when competing against another namespace with a high number of low-throughout logical streams.

FIG. 2B shows an example weighted proportional scheme for assigning logical streams to hardware streams, according to one embodiment. In the present example, the total number of logical streams of the namespaces NS1-NS6 are 80 (1+8+64+2+4+1). The proportions of each namespace NS1-NS6 are 0.0125, 0.1, 0.8, 0.025, 0.05, and 0.0125. The total I/O throughputs of each namespace NS1-NS6 are 12, 24, 64, 8, 8, and 4 Megabytes/seconds (MB/s). The throughput proportion of each namespace is its contribution to the whole throughput. That is, TP Proportions for NS1-NS6 are 0.1, 0.2, 0.533, 0.067, 0.067, and 0.033. It is noted that the I/O throughput of each namespace may be measured using different metrics such as the number of data packets per a unit time slot. Based on these I/O throughputs, the weighted number of logical streams for each namespace is calculated as follows:

Weighted *LS*=(Throughput Proportion/*LS* Proportion)
*Number of *LS*.

For example, the namespace NS1 has only 1 logical stream, but its weighted logical stream is 8 ((0.1/0.125)*1). This implies that the logical stream (only one) of the namespace NS1 is given a higher weight than its number of logical streams because the I/O throughput for the logical stream is higher compared the average I/O throughput of other logical streams that belong to other namespaces NS2-NS6. In another example, the namespace NS3 has 64 logical streams, but its weighted logical stream is 42.667 ((0.533/0.8)*64). This implies that the logical stream of the namespace NS3 is given a lower weight compared its number of logical streams because its I/O throughput is lower than the average I/O throughput of other logical streams that belong to other namespaces NS1, NS2, and NS4-NS6. Based on the weighted logical streams, the hardware streams are assigned to each namespace NS1-NS6.

According to one embodiment, the stream mapper 150 may employ a fair and balanced scheme. The stream mapper 150 divides hardware streams fairly amongst the namespaces based on the number of namespaces, and no namespace can have more hardware streams than the number of logical streams required. If there are more namespaces than hardware streams, some namespaces can be selected to share hardware streams. In some embodiments, if there are remaining hardware streams after giving each namespace a fair number of streams, the remaining hardware streams can be assigned to the namespaces based on a proportional scheme as discussed above.

If there are more streams than namespaces, and the division of the streams is unequal, then the stream mapper 150 assigns the remaining hardware streams to the namespaces based on a demand for the logical streams or I/O throughput. The fair and balanced scheme recognizes that the namespace is an ultimate determiner of data relatedness or closeness when all other factors for assigning or merging logical streams fail, or are unusable (or too fine-grained).

For a system having X hardware streams and Y namespaces, a floor value is calculated by the number of hardware streams divided by the number of namespaces:

floor=integer[(number of hardware streams)/(number of namespaces)].

Depending on the value of the floor, the stream mapper 150 can apply different fair and balanced mapping schemes.

In one embodiment, when the floor value is larger than or equal to one, i.e., the number of available hardware streams is larger than or equal to the number of namespaces, the stream mapper 150 can assign each namespace with at least one hardware stream (i.e., fair assignment). Herein, the term "fair" or "fairly" indicates that the maximum number of hardware streams assigned to a namespace does not exceed the number of logical streams running in the namespace. After the fair assigning of the hardware streams to the namespaces based on the floor value, the stream mapper 150 can assign the remaining hardware streams to the namespaces based on the remaining number of logical streams in each namespace.

Figure 3A:
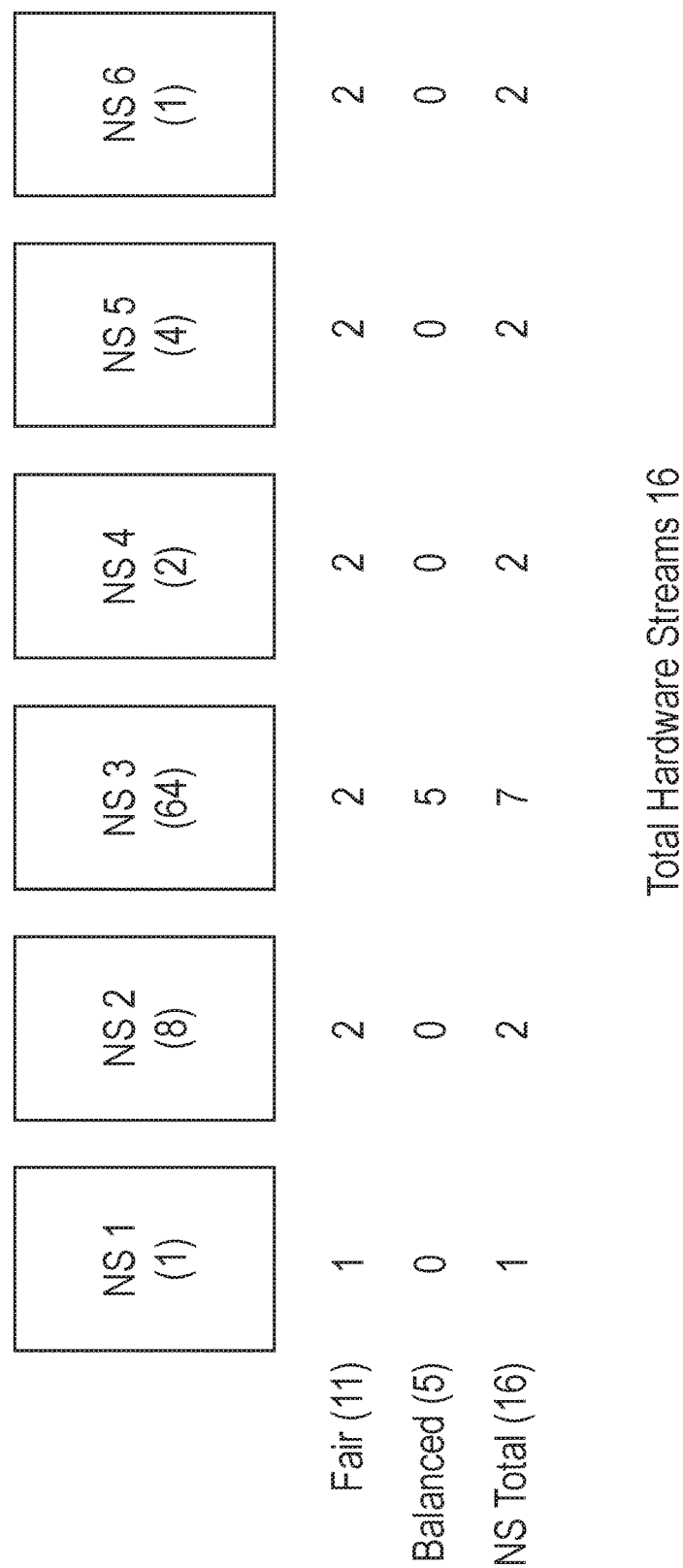
FIG. 3A shows an example fair and balanced scheme for assigning logical streams of namespaces to hardware streams, according to one embodiment.

FIG. 3A shows an example "fair and balanced" scheme for assigning logical streams of namespaces to hardware streams, according to one embodiment. In the present example, there are a total of 16 hardware streams available, and six namespaces (NS1 through NS6) are running. Therefore, the number of available hardware streams is larger than the number of namespaces, so the floor value is larger than or equal to one.

The namespace NS1 has 1 logical stream, the namespace NS2 has 8 logical streams, the namespace NS3 has 64 logical streams, the namespace NS4 has 2 logical streams, the namespace NS5 has 5096 logical streams, and the namespace 6 has 128 logical streams. These values are simply examples for illustration, and it is noted that any namespace may have any number of associated logical streams. The floor value in this case is 2 (integer (16/6)), therefore up to two hardware streams can be assigned to each of the namespaces. However, the namespace NS1 has only one logical stream, therefore only one hardware stream is assigned to the namespace NS1. This completes the assignment of the hardware streams based on the fairness, and a total of 11 hardware streams out of the 16 available hardware streams are assigned.

Once the fair assignment is completed, the stream mapper 150 assigns the remaining hardware streams based on the "balance" of the logical streams for each namespace. The balanced assignment of the hardware streams depends on the number of logical streams for each namespace. For example, the namespace NS3 having 64 logical streams is assigned with all of the remaining 5 hardware streams based on a proportion of the remaining logical streams for each namespace (assuming otherwise equal throughput). The namespaces NS1, NS2, NS4, NS5, and NS6 are not assigned with any of the remaining hardware streams because they have a relatively smaller number of logical streams compared to the namespaces NS3, NS5, and NS6 (and throughput is assumed equal in the example). This "balanced" assignment of the remaining hardware streams completes the mapping of the total of 16 hardware streams.

Figure 3B:
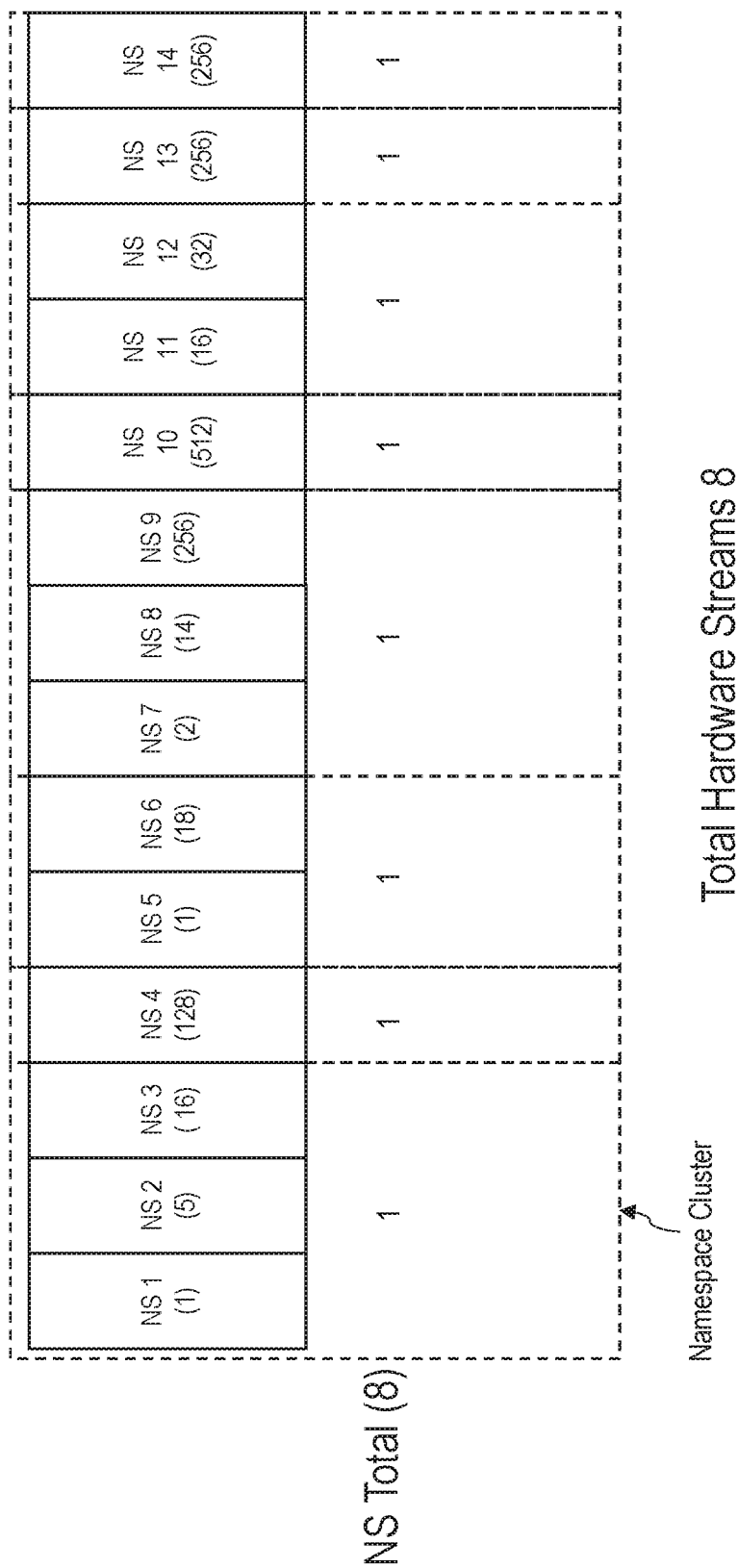
FIG. 3B shows an example fair and balanced scheme for assigning logical streams of namespaces to hardware streams, according to another embodiment.

FIG. 3B shows an example fair and balanced scheme for assigning logical streams of namespaces to hardware streams, according to another embodiment. In this example, there are 8 hardware streams available, and 14 namespaces, resulting in the floor being less than one. Therefore, some namespaces cannot be assigned with at least one hardware stream. In this case, instead of assigning a fair number of hardware streams to each of the namespaces, the stream mapper 150 analyzes the I/O traffic patterns of each namespace as a whole and merges some namespaces having the same or similar characteristics into a logical namespace cluster. The stream mapper 150 continues to merge the namespaces into namespace clusters until the number of namespace clusters becomes equal to or less than the number of available hardware streams. The cluster-level grouping of namespaces by the stream mapper 150 reduces the number of namespace clusters so that each namespace cluster is assigned with a fair number of hardware streams.

In the present example, the namespaces NS1, NS2, and NS33 are grouped, the namespaces NS5 and NS6 are grouped, and the namespaces NS7, NS8, and NS9 are grouped, and the namespaces NS11 and NS12 are grouped into a respective namespace cluster. The namespaces NS4, NS10, NS13, and NS14 are not grouped, resulting in a single namespace cluster. Each of the namespace clusters are assigned with a fair number of hardware streams, in this case one hardware stream. If any hardware streams remain after the fair assignment of the hardware streams to the namespace clusters, the remaining hardware streams may be assigned to one or more namespace clusters based on the number of logical streams in the namespace clusters for a balanced assignment.

According to yet another embodiment, the stream mapper can map logical streams based on an even and proportional scheme. The even and proportional scheme is particularly useful when the number of hardware streams is much larger than the number of namespaces. Herein, the term "even" or "evenly" indicates that the same number of hardware streams are assigned to each namespace as a base number. The total number of the even numbers assigned to the namespaces may not exceed the hardware streams available. In some cases, the even number may include a "fair" number as discussed above in the fair and balanced scheme, but it may be limited to be less than the maximum number of hardware streams that the division allows. The stream mapper 150 assigns a defined, small base number of streams (e.g., one hardware stream) to each namespace. The remaining hardware streams are assigned to the namespaces based on a proportion of the logical streams for the namespaces. It is noted that the even and proportional scheme may collapse into a fair and balanced scheme as the base number of the hardware streams increases towards floor=integer [(number of hardware streams)/(number of namespaces)]. The even and proportional scheme is similar to a proportional scheme but can ensure that all namespaces are assigned with at least one hardware stream first, and the most populous namespace can be assigned with all or a large portion of the remaining hardware streams.

Figure 4:
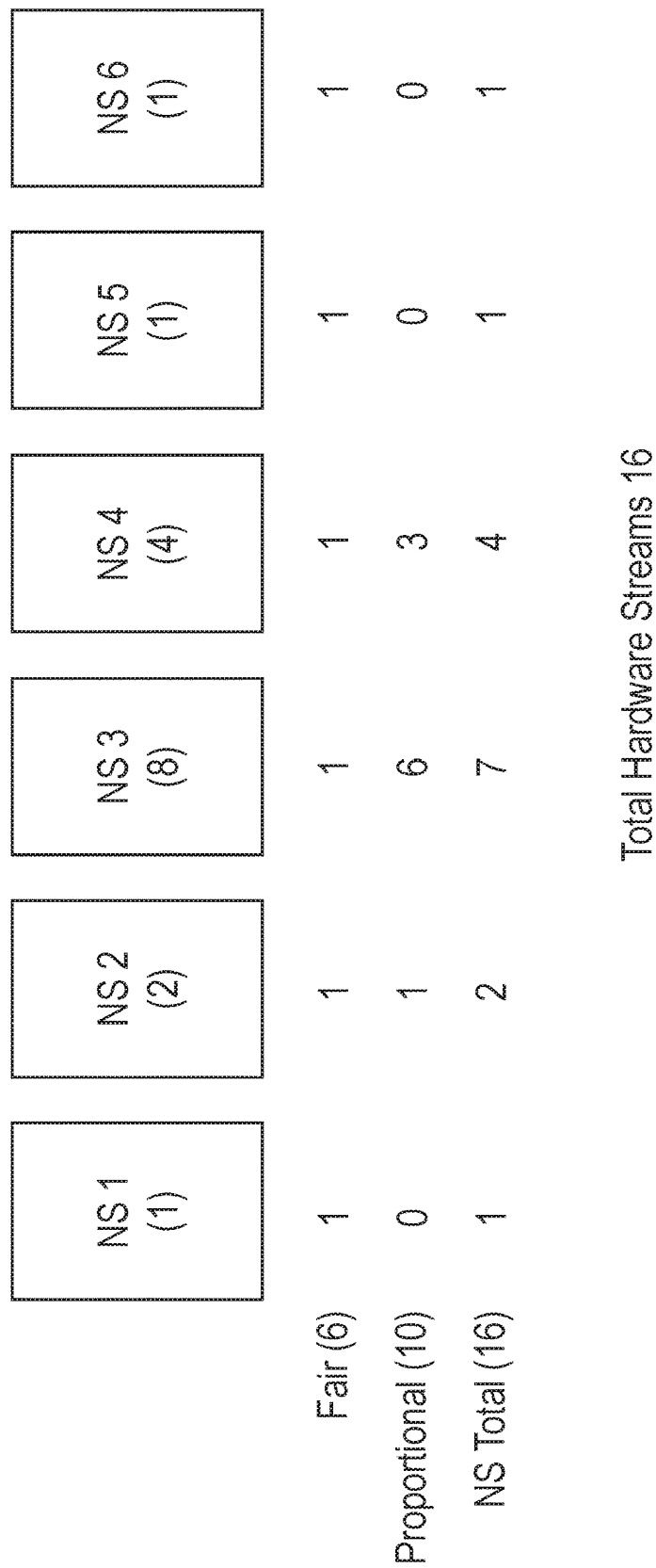
FIG. 4 shows an example even and proportional scheme for assigning logical streams to hardware streams, according to one embodiment.

FIG. 4 shows an example even and proportional scheme for assigning logical streams to hardware streams, according to one embodiment. In this example, the namespace NS1 has 1 logical stream, the namespace NS2 has 2 logical streams, the namespace NS3 has 8 logical streams, the namespace NS4 has 4 logical streams, the namespace NS5 has 1 logical streams, and the namespace 6 has 1 logical streams. The stream mapper 150 assigns a base (even) number of hardware streams (e.g., one hardware stream) to each of the namespaces to provide a low-level, basic streaming capability to each namespace, and further assigns the remaining hardware streams based on the proportion (e.g., unweighted or weighted proportion) of the logical streams (minus the 1 for hardware stream already distributed). In the present example, the namespace NS2 is assigned with one hardware stream, the namespace NS3 is assigned with six hardware streams, and the namespace NS4 is assigned with three hardware streams among the remaining ten hardware streams, assuming similar throughput for each of the logical streams, i.e., unweighted proportion.

According to another embodiment, the stream mapper 150 can map logical streams based on a hybrid auto-streaming scheme. The stream mapper 150 reserves a certain number of hardware streams for sharing/merging/coalescing namespaces, thereby assigning one hardware stream to more than one namespaces (herein also referred to as a "trans-namespace" assignment). The trans-namespace hardware streams are reserved for I/O traffic patterns that can span multiple namespaces. The stream mapper 150 can also use an auto-streaming logic to detect such trans-namespace streams to merge and assign a common hardware stream. The stream mapper 150 can then assign the remaining hardware streams to the namespaces based on one of the previously described assignment schemes such as a fair and balanced scheme, a proportional scheme, and an even and proportional scheme. The trans-namespace assignment may be differentiated from namespace clustering explained above with reference to FIG. 3B in that in the hybrid auto-streaming scheme, the namespace clustering is intentional and directly configurable from the start. That is, the amount of shared hardware streams, the namespaces that belong to them, and/or the data qualities that allow for inclusion in the hardware streams can optionally be defined by the host, and can be performed before the data storage drive analyzes how the remaining hardware streams are to be divided. In other words, in the hybrid auto-streaming approach, namespaces may be grouped into shared hardware streams as a first step, then the remaining hardware streams are distributed via other approaches, whereas in the "fair and balanced," "proportional," and "even and proportional" approaches, the clustering is only done as a later step, after the bulk of the hardware streams have already been assigned via the primary approach.

FIG. 5A shows an example of a hybrid auto-streaming scheme, according to one embodiment. In this example, there are eight hardware streams and eight namespaces. It is noted that the number of hardware streams and the namespaces may be the same or different. The auto-streaming logic of the stream mapper 150 may determine that the namespaces NS6, NS7, and NS8 are behaviorally coupled and can assign three (or any applicable number, as the host or auto-streaming detector may determine) hardware streams to the namespaces NS6, NS7, and NS8. Then, each of the namespaces NS1, NS2, NS3, NS4, and NS5 is independently assigned with one of the remaining hardware streams. The three shared hardware streams may not be tied to a specific namespace. Instead, the three shared hardware streams are used to efficiently perform I/O operations that span the namespaces NS6, NS7, and NS8. As a more specific example, the namespaces NS6, NS7, and NS8 may each have multiple logical streams; and each of those logical streams within a given namespace may be directed into one of the three shared hardware streams.

Figure 5B:
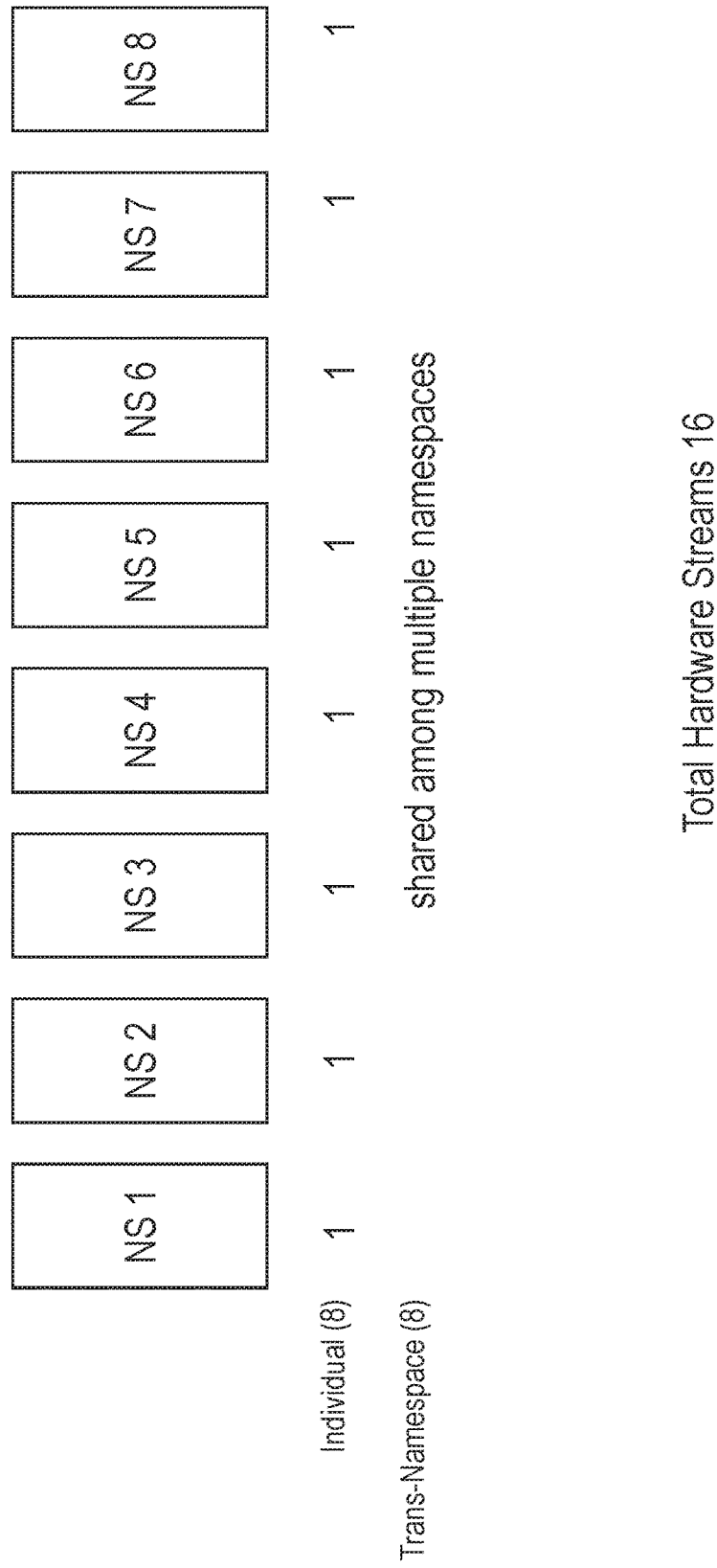
FIG. 5B shows an example of a hybrid auto-streaming scheme, according to another embodiment.

FIG. 5B shows an example of a hybrid auto-streaming scheme, according to another embodiment. In this example, there are 16 hardware streams and eight namespaces. It is noted that the number of hardware streams and the namespaces may be the same or different. Each of the namespaces NS1-NS8 is respectively assigned with one hardware stream. The auto-streaming logic of the stream mapper 150 may reserve the remaining eight hardware streams for auto-streaming for operations that can span multiple namespaces. The hardware streams reserved for auto-streaming may be useful for cases when the I/O operation is not specified with an identifier of a specific namespace indicating that the I/O operations is a trans-namespace operation. A distribution similar to this may be useful in cases where the namespaces each contain several logical streams, some of which are similar in nature to those of the other namespace, and some of which are unique in nature to that namespace. The unique logical streams of each namespace can use the individual hardware streams dedicated to the namespace, and the logical streams that are similar to those of other namespaces can the utilize the shared hardware streams.

When a namespace (or namespace cluster) is added, removed, or changed substantially, the present stream mapping scheme may be rerun. If there is a change to the namespaces that use the currently assigned hardware streams, the stream mapper can re-run the mapping scheme to redistribute hardware streams, and the new and unassigned namespaces may be assigned with hardware streams based on a new mapping scheme. When the hardware streams are re-distributed, the mapping scheme may change from one mapping scheme to another mapping scheme. For example, an even and proportional scheme may switch to a fair and balanced scheme as the base number of the hardware streams increases.

Figure 6:
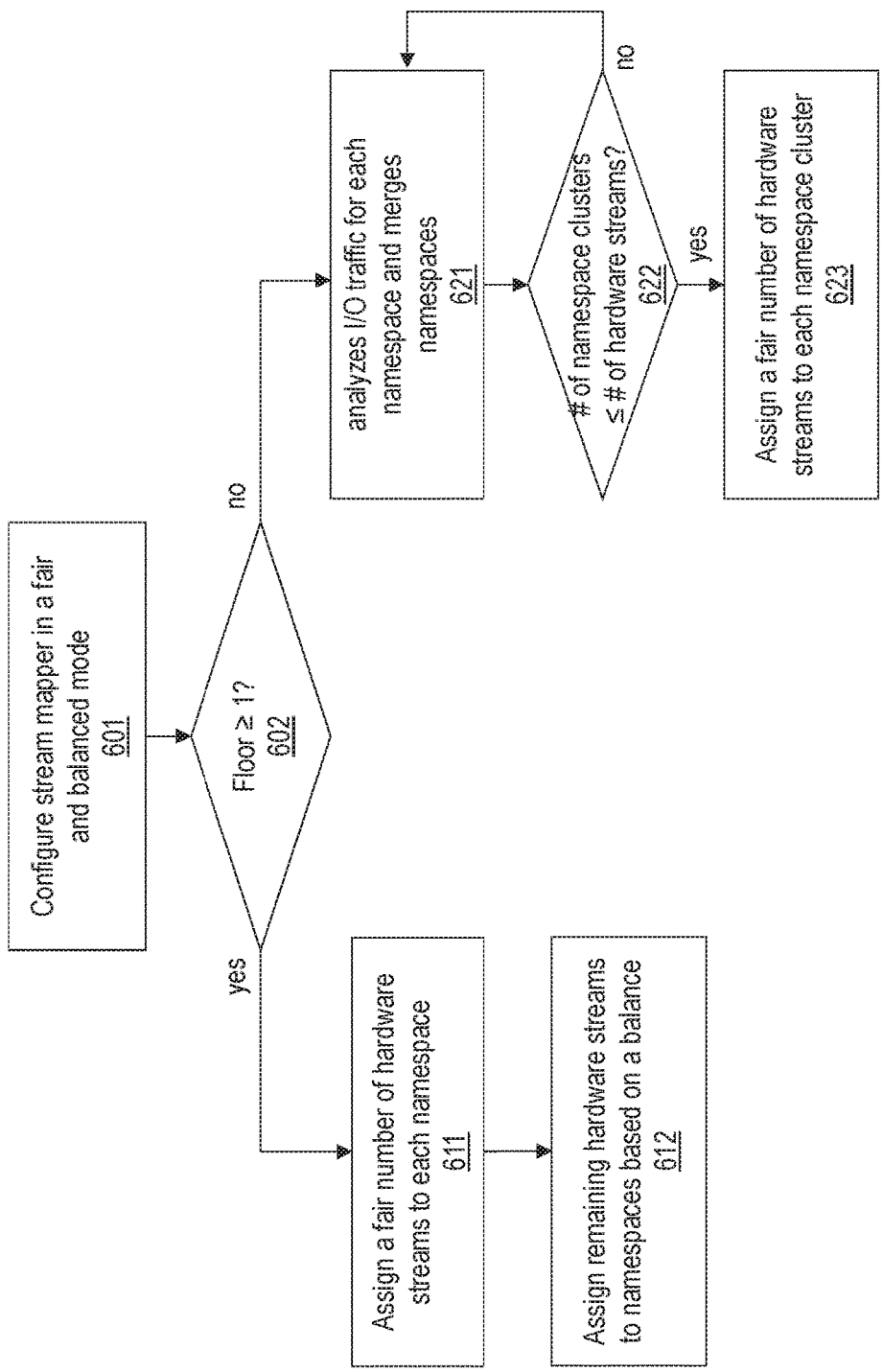
FIG. 6 is a flowchart of an example fair and balanced mapping scheme, according to one embodiment.

FIG. 6 is a flowchart of an example fair and balanced mapping scheme, according to one embodiment. A host can configure the stream mapper to operate in a fair and balanced mode (601). Alternatively, the stream mapper can monitor the I/O traffic pattern and configures itself to operate in a fair and balanced mode based on the number of available hardware streams, the number of namespaces, the number of logical streams per each namespace, etc. The stream mapper calculates a floor value and checks if the floor value is greater than or equal to one (602). If the floor is greater than or equal to one, the stream mapper assigns a fair number of hardware streams to each namespace (i.e., fair assignment) (611) and assigns the remaining hardware streams to the namespaces based on a number of logical streams (i.e., balanced assignment) (612). If the floor value is not greater than or equal to one, the stream mapper analyzes I/O traffic patterns for each namespace and merges namespaces based on the I/O traffic patterns to create namespace clusters (621). The merging process continues until the number of namespace clusters is equal to or less than the number of available hardware streams (622). The stream mapper assigns a fair number of hardware streams to each namespace cluster (i.e., fair assignment) (623).

Figure 7:
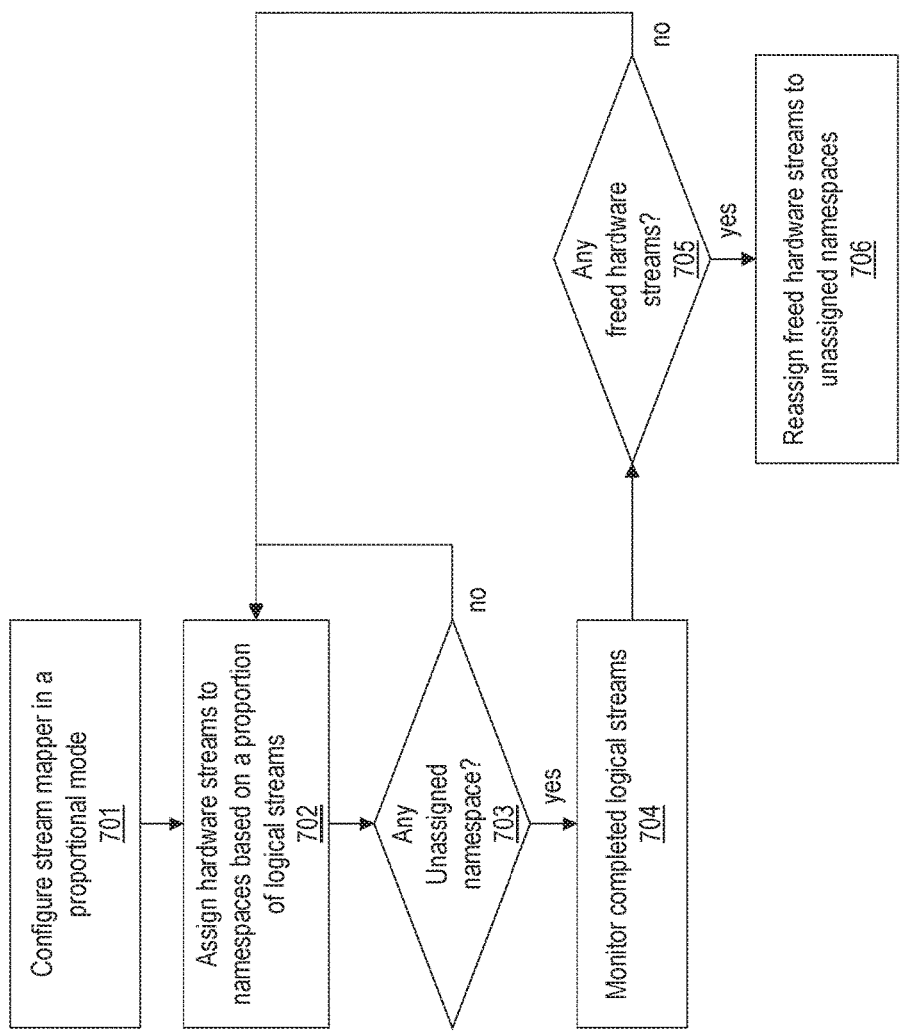
FIG. 7 is a flowchart of an example proportional mapping scheme, according to one embodiment.

FIG. 7 is a flowchart of an example proportional mapping scheme, according to one embodiment. A host can configure the stream mapper to operate in a proportional mode (701). Alternatively, the stream mapper can monitor the I/O traffic pattern and configures itself to operate in a fair and balanced mode based on the number of available hardware streams, the number of namespaces, the number of logical streams per each namespace, etc. The stream mapper assigns hardware streams to namespaces based on a proportion of logical streams (702). If there are any namespaces that are unassigned with hardware streams (703), the stream mapper monitors completed logical streams of namespaces that are assigned with hardware streams (704) and checks if any hardware streams are freed (705). The stream mapper reassigns the freed hardware streams to the unassigned namespaces (706). In one embodiment, the stream mapper monitors general I/Os of the namespaces using a general I/O stream. When a namespace (or namespace cluster) is added, removed, or changed substantially, the stream mapper can re-run the mapping scheme, and the hardware streams can be re-distributed.

Figure 8:
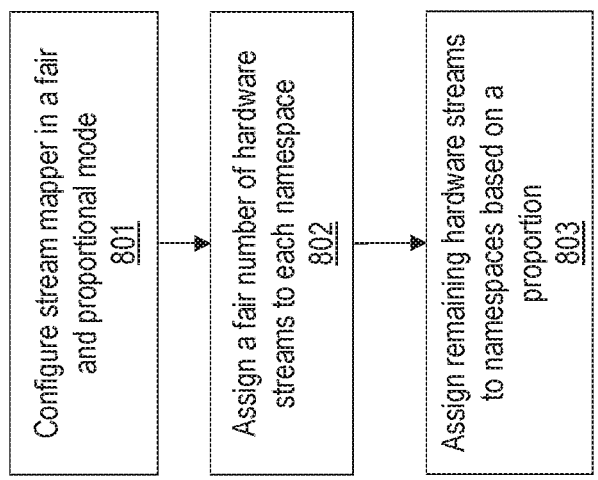
FIG. 8 is a flowchart of an example even and proportional mapping scheme, according to one embodiment.

FIG. 8 is a flowchart of an example even and proportional mapping scheme, according to one embodiment. A host can configure the stream mapper to operate in an even and proportional mode (801). Alternatively, the stream mapper can monitor the I/O traffic pattern and configures itself to operate in a fair and balanced mode based on the number of available hardware streams, the number of namespaces, the number of logical streams per each namespace, etc. The stream mapper assigns a first even number of hardware streams to each namespace (i.e., fair assignment) (802). The stream mapper further assigns any remaining hardware streams to the namespaces based on a proportion distribution (i.e., proportional assignment) (803).

Figure 9:
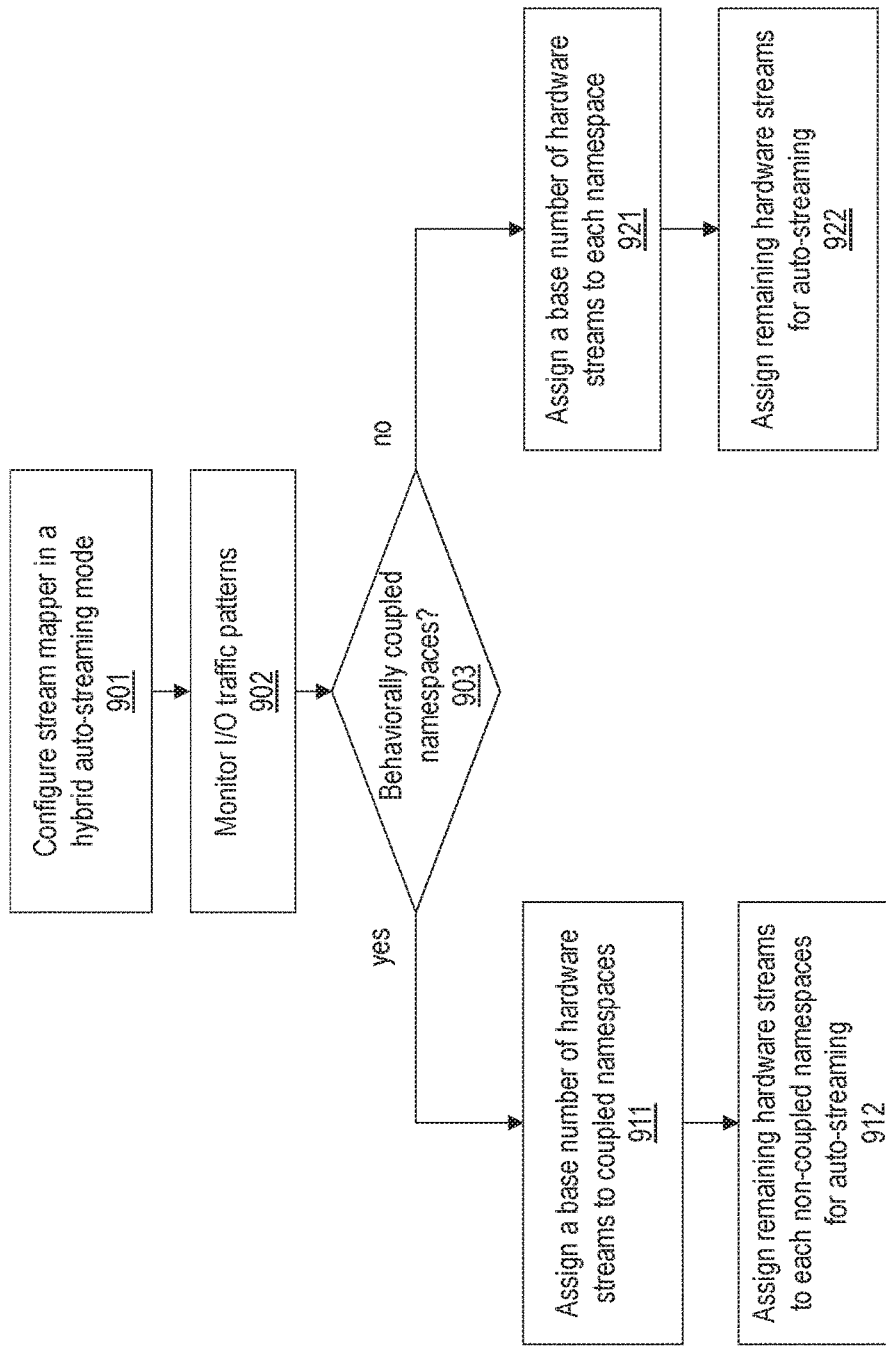
FIG. 9 is a flowchart of an example hybrid auto-streaming mapping scheme, according to one embodiment.

FIG. 9 is a flowchart of an example hybrid auto-streaming mapping scheme, according to one embodiment. A host can configure the stream mapper to operate in a hybrid auto-streaming mode (901). Alternatively, the stream mapper can monitor the I/O traffic pattern and configures itself to operate in a fair and balanced mode based on the number of available hardware streams, the number of namespaces, the number of logical streams per each namespace, etc. The stream mapper monitors I/O traffic patterns (902) and determines if there are any namespaces that can be behaviorally coupled (903). Behaviorally coupled namespaces may have logical streams that have the same or similar write sequentiality, lifespan, timing pattern, I/O size, a file type, and/or I/O traffic patterns. If there are any behaviorally coupled namespaces, the stream mapper assigns a base number of hardware streams to the behaviorally coupled namespaces (911) and further assigns the remaining hardware streams to each of non-coupled namespaces for auto-streaming (912). If there is no behaviorally coupled namespaces, the stream mapper assigns a base number of hardware streams to each namespace (921) and assigns the remaining hardware streams to the namespaces for auto-streaming among the namespaces (922).

According to one embodiment, a method includes: receiving logical streams from a plurality of namespaces; determining characteristics of logical streams associated with the plurality of namespaces; selecting a configurable assignment mode; and assigning the logical streams associated with the plurality of namespaces to a plurality of hardware streams to access physical storage blocks associated with a data storage device based on the characteristics of the logical streams and the configurable assignment mode. A number of hardware streams to access the physical storage blocks associated with the data storage drive is fixed, and a number of logical streams associated with the plurality of namespaces is varied depending on I/O processes running on a host computer.

The characteristics of the logical streams may include a write sequentiality, a lifespan, a timing pattern, an I/O size, a file type, a number of logical streams per each namespace, a proportion of the logical streams per each namespace, and input/output (I/O) traffic patterns of the logical streams.

The configurable assignment mode may be a fair and balanced mode, and the method may further includes: calculating a floor value to determine whether a number of hardware streams is greater than or equal to a number of namespaces; if the floor value is greater than or equal to one, assigning a fair number of hardware streams to each namespace and assigning remaining hardware streams to the namespaces based on the number of logical streams for each namespace; and if the floor value is less than one, analyzing the I/O traffic patterns for each namespace by collectively analyzing the I/O traffic patterns of the logical streams that belong to each namespace and merging namespaces having same or similar I/O traffic patterns into one or more namespace clusters; assigning a fair number of hardware streams to each namespace cluster.

The namespaces may be clustered until the number of namespace clusters is equal to or less than the number of hardware streams.

The configurable assignment mode may be a proportional mode, and the method may further include: assigning the hardware streams to the namespaces based on a weighted proportion of logical streams for each namespace. The weighted proportion for the logical streams may be calculated based on I/O throughput and a number of logical streams.

The configurable assignment mode may be an even and proportional mode, and the method may further include: assigning a first number of hardware streams to each namespace; and assigning the remaining hardware streams to the namespaces based on a weighted proportion of the logical streams for each namespace. The weighted proportion for the logical streams may be calculated based on I/O throughput and a number of logical streams.

The configurable assignment mode may be a hybrid auto-streaming mode, and the method may further include: monitoring the I/O traffic patterns associated with the logical streams; determining whether there are behaviorally coupled namespaces based on the I/O traffic patterns.

The method may further include: assigning a base number of hardware streams to behaviorally coupled namespaces; and assigning the remaining hardware streams to each namespace that is not behaviorally coupled for auto-streaming.

The method may further include: assigning a base number of hardware streams to each namespace if there are no behaviorally coupled namespaces; and assigning remaining hardware streams to the namespace that are behaviorally coupled for auto-streaming.

According to another embodiment, a data storage device includes: a plurality of data storage blocks; and a stream mapper configured to: receive logical streams from a plurality of namespaces; determine characteristics of logical streams associated with the plurality of namespaces; select a configurable assignment mode; and assign the logical streams associated with the plurality of namespaces to a plurality of hardware streams to access the plurality of data storage blocks based on the characteristics of the logical streams and the configurable assignment mode. A number of hardware streams to access the physical storage blocks associated with the data storage drive is fixed, and a number of logical streams associated with the plurality of namespaces is varied depending on I/O processes running on a host computer.

The data storage device may be a solid-state drive (SSD) implemented with an auto-streaming feature.

The characteristics of the logical streams may include a write sequentiality, a lifespan, a timing pattern, an I/O size, a file type, a number of logical streams per each namespace, a proportion of the logical streams per each namespace, and input/output (I/O) traffic patterns of the logical streams.

The configurable assignment mode may be a fair and balanced mode, and the stream mapper may be further configured to: calculate a floor value to determine whether a number of hardware streams is greater than or equal to a number of namespaces; if the floor value is greater than or equal to one, assign a fair number of hardware streams to each namespace and assign remaining hardware streams to the namespaces based on the number of logical streams for each namespace; and if the floor value is less than one, analyze the I/O traffic patterns for each namespace by collectively analyzing the I/O traffic patterns of the logical streams that belong to each namespace and merge namespaces having same or similar I/O traffic patterns into one or more namespace clusters; and assign a fair number of hardware streams to each namespace cluster.

The namespaces may be clustered until the number of namespace clusters is equal to or less than the number of hardware streams.

The configurable assignment mode may be a proportional mode, and the stream mapper may be further configured to: assign the hardware streams to the namespaces based on a weighted proportion of logical streams for each namespace. The weighted proportion for the logical streams may be calculated based on I/O throughput and a number of logical streams.

The configurable assignment mode may be an even and proportional mode, and the stream mapper may be further configured to: assign a first number of hardware streams to each namespace; and assign the remaining hardware streams to the namespaces based on a weighted proportion of the logical streams for each namespace. The weighted proportion for the logical streams may be calculated based on I/O throughput and a number of logical streams.

The configurable assignment mode may be a hybrid auto-streaming mode, and the stream mapper may be further configured to: monitor the I/O traffic patterns associated with the logical streams; and determine whether there are behaviorally coupled namespaces based on the I/O traffic patterns.

The stream mapper may be further configured to: assign a base number of hardware streams to behaviorally coupled namespaces; and assign the remaining hardware streams to each namespace that is not behaviorally coupled for auto-streaming.

The stream mapper may be further configured to: assign a base number of hardware streams to each namespace if there are no behaviorally coupled namespaces; and assign remaining hardware streams to the namespace that are behaviorally coupled for auto-streaming.

The above example embodiments have been described hereinabove to illustrate various embodiments of implementing a system and method for mapping streams to storage blocks based on namespaces. Various modifications and departures from the disclosed example embodiments will occur to those having ordinary skill in the art. The subject matter that is intended to be within the scope of the invention is set forth in the following claims.

What is claimed is:

1. A method comprising:
   receiving logical streams from a plurality of namespaces;
   determining characteristics of logical streams associated with the plurality of namespaces;
   selecting a configurable assignment mode; and
   assigning the logical streams associated with the plurality of namespaces to a plurality of hardware streams to access physical storage blocks associated with a data storage device based on the characteristics of the logical streams and the configurable assignment mode,
   wherein a number of hardware streams to access the physical storage blocks associated with the data storage drive is fixed, and a number of logical streams associated with the plurality of namespaces is varied depending on I/O processes running on a host computer.

2. The method of claim 1, wherein the characteristics of the logical streams include a write sequentiality, a lifespan, a timing pattern, an I/O size, a file type, a number of logical streams per each namespace, a proportion of the logical streams per each namespace, and input/output (I/O) traffic patterns of the logical streams.

3. The method of claim 1, wherein the configurable assignment mode is a fair and balanced mode, and the method further comprises:
   calculating a floor value to determine whether a number of hardware streams is greater than or equal to a number of namespaces;
   if the floor value is greater than or equal to one, assigning a fair number of hardware streams to each namespace and assigning remaining hardware streams to the namespaces based on the number of logical streams for each namespace; and
   if the floor value is less than one, analyzing the I/O traffic patterns for each namespace by collectively analyzing the I/O traffic patterns of the logical streams that belong to each namespace and merging namespaces having same or similar I/O traffic patterns into one or more namespace clusters; assigning a fair number of hardware streams to each namespace cluster.

4. The method of claim 3, wherein the namespaces are clustered until the number of namespace clusters is equal to or less than the number of hardware streams.

5. The method of claim 1, wherein the configurable assignment mode is a proportional mode, and the method further comprises:
   assigning the hardware streams to the namespaces based on a weighted proportion of logical streams for each namespace, wherein the weighted proportion for the logical streams is calculated based on I/O throughput and a number of logical streams.

6. The method of claim 1, wherein the configurable assignment mode is an even and proportional mode, and the method further comprises:
   assigning a first number of hardware streams to each namespace; and
   assigning the remaining hardware streams to the namespaces based on a weighted proportion of the logical streams for each namespace,
   wherein the weighted proportion for the logical streams is calculated based on I/O throughput and a number of logical streams.

7. The method of claim 1, wherein the configurable assignment mode is a hybrid auto-streaming mode, and the method further comprises:
   monitoring the I/O traffic patterns associated with the logical streams;
   determining whether there are behaviorally coupled namespaces based on the I/O traffic patterns.

8. The method of claim 7, further comprising:
   assigning a base number of hardware streams to behaviorally coupled namespaces; and
   assigning the remaining hardware streams to each namespace that is not behaviorally coupled for auto-streaming.

9. The method of claim 7, further comprising:
   assigning a base number of hardware streams to each namespace if there are no behaviorally coupled namespaces; and
   assigning remaining hardware streams to the namespace that are behaviorally coupled for auto-streaming.

10. A data storage device comprising:
    a plurality of data storage blocks; and
    a stream mapper configured to:
      receive logical streams from a plurality of namespaces;
      determine characteristics of logical streams associated with the plurality of namespaces;
      select a configurable assignment mode; and
      assign the logical streams associated with the plurality of namespaces to a plurality of hardware streams to access the plurality of data storage blocks based on the characteristics of the logical streams and the configurable assignment mode,
      wherein a number of hardware streams to access the physical storage blocks associated with the data storage drive is fixed, and a number of logical streams associated with the plurality of namespaces is varied depending on I/O processes running on a host computer.

11. The data storage device of claim 10, wherein the data storage device is a solid-state drive (SSD) implemented with an auto-streaming feature.

12. The data storage device of claim 10, wherein the characteristics of the logical streams include a write sequentiality, a lifespan, a timing pattern, an I/O size, a file type, a number of logical streams per each namespace, a proportion of the logical streams per each namespace, and input/output (I/O) traffic patterns of the logical streams.

13. The data storage device of claim 10, wherein the configurable assignment mode is a fair and balanced mode, and the stream mapper is further configured to:
calculate a floor value to determine whether a number of hardware streams is greater than or equal to a number of namespaces;
if the floor value is greater than or equal to one, assign a fair number of hardware streams to each namespace and assign remaining hardware streams to the namespaces based on the number of logical streams for each namespace; and
if the floor value is less than one, analyze the I/O traffic patterns for each namespace by collectively analyzing the I/O traffic patterns of the logical streams that belong to each namespace and merge namespaces having same or similar I/O traffic patterns into one or more namespace clusters; and assign a fair number of hardware streams to each namespace cluster.

14. The data storage device of claim 13, wherein the namespaces are clustered until the number of namespace clusters is equal to or less than the number of hardware streams.

15. The data storage device of claim 10, wherein the configurable assignment mode is a proportional mode, and the stream mapper is further configured to:
assign the hardware streams to the namespaces based on a weighted proportion of logical streams for each namespace, wherein the weighted proportion for the logical streams is calculated based on I/O throughput and a number of logical streams.

16. The data storage device of claim 10, wherein the configurable assignment mode is an even and proportional mode, and the stream mapper is further configured to:
assign a first number of hardware streams to each namespace; and
assign the remaining hardware streams to the namespaces based on a weighted proportion of the logical streams for each namespace,
wherein the weighted proportion for the logical streams is calculated based on I/O throughput and a number of logical streams.

17. The data storage device of claim 10, wherein the configurable assignment mode is a hybrid auto-streaming mode, and the stream mapper is further configured to:
monitor the I/O traffic patterns associated with the logical streams; and
determine whether there are behaviorally coupled namespaces based on the I/O traffic patterns.

18. The data storage device of claim 17, wherein the stream mapper is further configured to:
assign a base number of hardware streams to behaviorally coupled namespaces; and
assign the remaining hardware streams to each namespace that is not behaviorally coupled for auto-streaming.

19. The data storage device of claim 17, wherein the stream mapper is further configured to:
assign a base number of hardware streams to each namespace if there are no behaviorally coupled namespaces; and
assign remaining hardware streams to the namespace that are behaviorally coupled for auto-streaming.

* * * * *